United States Patent [19]
Haigh

[11] Patent Number: 5,793,861
[45] Date of Patent: Aug. 11, 1998

[54] TRANSACTION PROCESSING SYSTEM AND METHOD

[75] Inventor: Steven Paul Haigh, Oxford, Conn.

[73] Assignee: Executone Information Systems, Inc., Milford, Conn.

[21] Appl. No.: 665,001

[22] Filed: Jun. 11, 1996

[51] Int. Cl.⁶ ................................................. H04Q 3/64
[52] U.S. Cl. ........................... 379/266; 379/265; 379/309
[58] Field of Search ............................ 379/201, 209, 379/225, 265, 266, 309, 67, 88, 89, 90.01, 93.24; 370/429, 412, 413, 415, 417

[56] References Cited

U.S. PATENT DOCUMENTS

| | | | |
|---|---|---|---|
| 5,008,930 | 4/1991 | Gawrys et al. | 379/210 |
| 5,040,208 | 8/1991 | Jolissaint | 379/209 |
| 5,168,446 | 12/1992 | Wiseman | 705/37 |
| 5,181,239 | 1/1993 | Jolissaint | 379/265 |
| 5,206,903 | 4/1993 | Kohler et al. | 379/265 |
| 5,278,898 | 1/1994 | Cambray et al. | 379/265 |
| 5,299,260 | 3/1994 | Shaio | 379/265 |
| 5,329,583 | 7/1994 | Jurgensen et al. | 379/265 |
| 5,333,266 | 7/1994 | Boaz et al. | 379/89 |
| 5,335,269 | 8/1994 | Steinlicht | 379/265 |
| 5,473,680 | 12/1995 | Porter | 379/266 |
| 5,530,740 | 6/1996 | Irribarren et al. | 379/89 |

Primary Examiner—Krista Zele
Assistant Examiner—Scott Wolinsky
Attorney, Agent, or Firm—Dilworth & Barrese

[57] ABSTRACT

A transaction processing system and method includes a transaction interface for conveying transactions; a memory for storing the transactions in a queue; and a processor. The processor includes an identifier generator for generating an identifier for each transaction in the queue; and a transaction controller for using the identifier to provide access by an agent to the transaction corresponding to the identifier. The transaction processing system and method provides for the management and processing of transactions including inbound and outbound telephone calls as well as other transactions such as electronic mail, voice mail, video calls, facsimile transmissions, data packets over the Internet, etc. Automatic source identification may be used, such as automatic number identification, for providing agents with available information of an inbound caller or message sender prior to handling such caller or sender for improved transaction processing.

20 Claims, 6 Drawing Sheets

TRANSACTION PROCESSING SYSTEM AND METHOD

BACKGROUND INFORMATION

1. Technical Field

This disclosure relates to data processing, and in particular to a transaction processing system and method.

2. Description of the Related Art

Some telephone systems automatically distribute incoming or inbound calls among a plurality of telephone stations. These automated call distribution (ACD) systems have been applied, for example, to route inbound telephone calls to telephone stations assigned to specific personnel or inbound agents. In other applications, outbound telephone calls may be initiated by an ACD using automated dialers and predictive dialing techniques, and the ACD then transfers the established calls to outbound agents. ACDs may employ call queues and various distribution algorithms and methods, implementable in software, to enhance performance of the overall telephone system.

Inbound and outbound calls may be deemed transactions, in which a telemarketing campaign or other facility transacts with actual and/or potential contacts such as customers. Heretofore, previous call processing systems have been limited to processing transactions involving telephone calls.

SUMMARY

It is recognized herein that the management and processing of transactions including inbound and outbound telephone calls as well as other transactions such as electronic mail, voice mail, video calls, facsimile transmissions, data packets over the Internet, etc. would facilitate improved productivity in telemarketing activities.

A transaction processing system and method is disclosed which includes a transaction interface for conveying transactions; a memory for storing the transactions in a queue; and a processor. The processor includes an identifier generator for generating an identifier for each transaction in the queue; and a transaction controller for using the identifier to provide access by an agent to the transaction corresponding to identifier.

BRIEF DESCRIPTION OF THE DRAWINGS

The features of the disclosed call transaction processing system and method will become more readily apparent and may be better understood by referring to the following detailed description of illustrative embodiments of the present invention, taken in conjunction with the accompanying drawings, in which.

DESCRIPTION OF THE PREFERRED EMBODIMENTS

Figure 1:
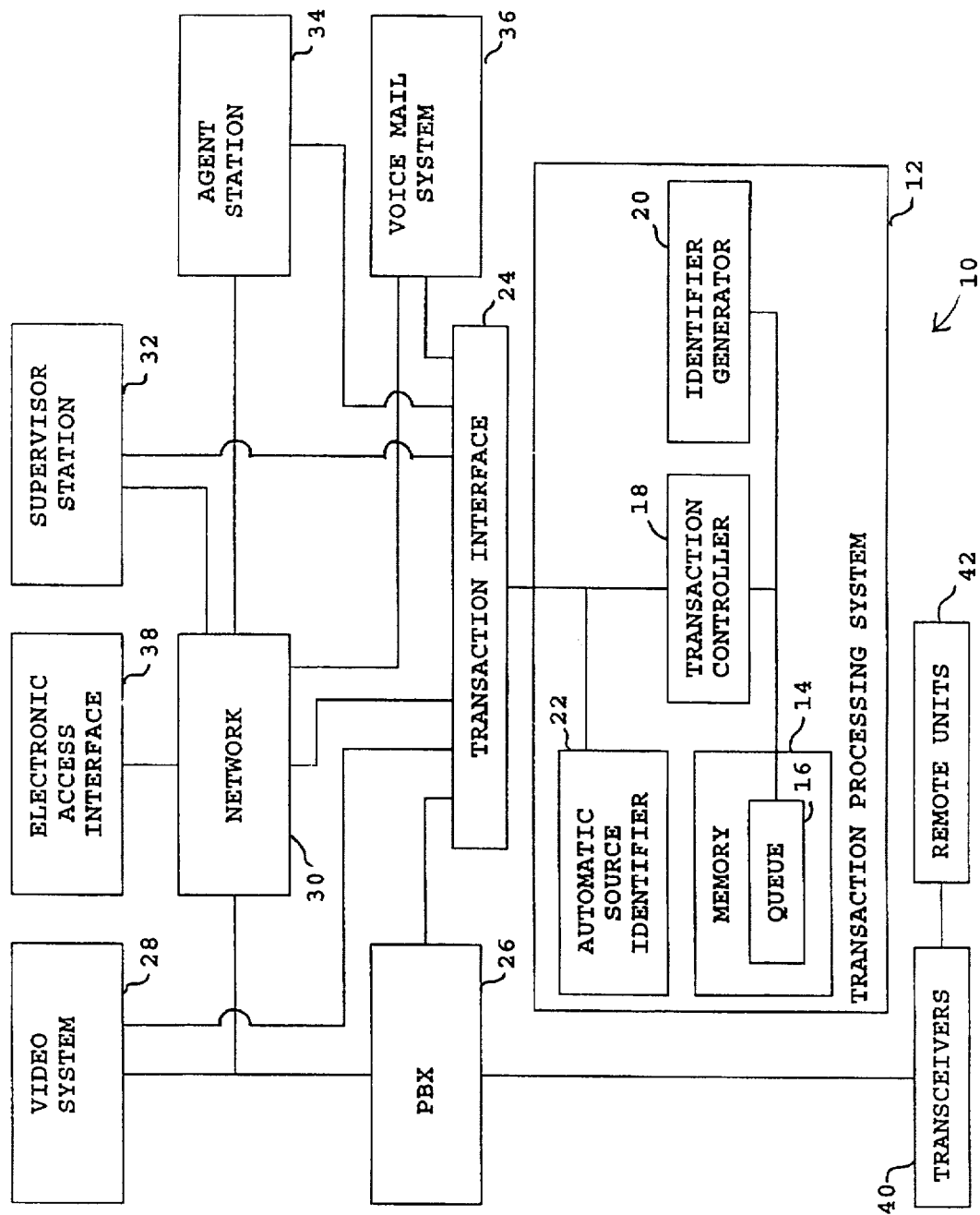
FIG. 1 is a block diagram of the transaction processing system.

Referring now in specific detail to the drawings, with like reference numerals identifying similar or identical elements, as shown in FIG. 1, the present disclosure describes a system and method for managing and processing transactions. The system 10 is capable of receiving transactions from entities in which the transactions may include electronic mail (E-mail), voice mail, video calls, facsimile (fax) transmissions, etc. through network connections, such as the Internet as well as telephone and/or wireless connections to other networks. Such entities may be people, companies, other institutions, and other computer systems and networks.

The system 10 includes a transaction processing system 12 having a memory 14 for storing transactions in at least one queue 16, a transaction controller 18, and an identifier generator 20.

The transaction controller 18 includes, in an illustrative embodiment, an "INTEL" "PENTIUM"-based central processing unit (CPU), and the memory 14 has random access memory (RAM) with about 16 Megabytes (MB) capacity, about 1 Gigabytes (GB) hard or fixed disk drive, a 3.5 inch 1.44 MB floppy disk drive, and/or a 120 MB internal tape drive. The capacity of each of the memory devices is expandable, and the memory 14 may be incorporated into the transaction controller 18. Disk drive and tape drive controllers are provided.

The transaction controller 18 processes transactions received and sent through a transaction interface 24, and controls the queue 16 to store received transactions, for example, in a First-In, First-Out (FIFO) order, which may be a default queue processing order capable of being modified by a supervisor. It is understood that other known queue processing techniques may be used, such a Last-In, First-Out (LIFO) ordering of transactions, selective processing of transactions in a queue, and queue processing based on, for example, the current loading or length of the queue. Upon receiving a transaction, the transaction controller 18 queues the transaction in at least one queue 16. The queue 16 may include a plurality of classes or types of queues, such as E-mail queues and facsimile queues, and may include at least one queue and/or subqueue for each class or type of queue.

The operation of the transaction processing system 12 may incorporate automatic call distribution (ACD) techniques known in the art. For example, inbound and outbound calls as transactions may be handled and supervised by ACD management and supervising systems with ACD features, such as those features described in greater detail in commonly assigned U.S. Pat. No. 5,341,412, issued Aug. 23, 1994; U.S. Pat. No. 5,465,286, issued Nov. 7, 1995; and U.S. patent application Ser. No. 08/123,309, filed Sep. 17, 1993, now abandoned, and entitled APPARATUS AND METHOD FOR DYNAMIC INBOUND/OUTBOUND CALL MANAGEMENT AND FOR SCHEDULING APPOINTMENTS, each of which are incorporated herein by reference. The transaction controller 18 may include an ACD system having a server and automatic dialer, such as the "INFOSTAR" dialer available from EXECUTONE INFORMATION SYSTEMS, INC., for processing transactions such as inbound and outbound calls.

After queuing the transaction, the transaction processing system 12 generates an identifier, such as a signal or bit sequence, using the identifier generator 20. Each identifier is associated with a respective transaction, which may be any type of transaction, to tag the transaction stored in the respective queue 16. In one embodiment, the type of the transaction is identified by the source of the transaction; for example, Internet transactions may be identified as any transactions arriving or being sent through a port or jack connected to the Internet, while facsimile transactions are identified as any transactions arriving or being sent through facsimile ports. Alternatively, signal processing techniques known in the art may identify the transaction by the waveform of the signal associated with the transaction; for example, video signals have distinct video frequencies and formats. The signal processing may also be performed on digital bitstreams in like manner to distinguish transactions by their corresponding bit sequences; for example, asynchronous transfer mode (ATM) packets are distinguished as having a ATM length and header.

In another embodiment, the identifier generator 20 may include a system clock to generate timestamps as the identifiers. In additional embodiments, the identifier generator 20 may generate the identifiers sequentially using a counter, and the identifiers may be stored in an identifier table stored in the memory 14. In a further embodiment, the identifier generator 20 may generate a unique identifier from at least a portion of the received transaction by, for example, truncating and/or digitizing a portion of the data of the transaction.

The transactions received and transmitted to the transaction processing system 12 through the transaction interface 24 are provided by at least one source of transactions, such as a private branch exchange (PBX) 26, a video system 28, a network 30 such as a local area network (LAN) and/or a wide area network (WAN), at least one supervisor station 32, at least one agent station 34, and/or a voice mail system 36.

In particular, the PBX 26 may be an "INTEGRATED DIGITAL SYSTEM" (IDS) communications processor, available from "EXECUTONE INFORMATION SYSTEMS, INC." The IDS communications process may have a 108/228/432/648 port configurations running under at least one of three CPU types: 228, ECPU, and ACPU, and capable of processing and routing telephone calls within a company and/or to and from a telephone company (not shown in FIG. 1). The PBX 26 may also be connected to the video system 28 for processing video calls such as video teleconferencing. The video system 28 may also include intra-facility cameras for teleconferencing and for security.

The network 30 may be a server connected to the at least one supervisor station 32 and the at least one agent station 34 for providing communications between supervisors and agents using stations 32, 34, as well as with customers through PBX 26. In an illustrative embodiment, the network 30 operates a network protocol such as a Carrier Sense Multiple Access with Collision Detection (CSMA/CD) protocol.

The network 30 may also be connected to the video system 28 and the voice mail system 36 for providing communications such as video calls and voice mail to supervisors and agents.

The network 30 is also connected to an electronic access interface 38 such as a gateway to the Internet and/or an account or dedicated lines to electronic communication systems such as the Internet and the World Wide Web, as well as other computer systems such as servers, databases, bulletin boards, and electronic mail (E-mail) systems. For example, the electronic access interface 38 may operate a Serial Line Internet Protocol (SLIP) or a Point-to-Point Protocol (PPP) for conveying text, data files, audio, video, E-mail and/or voice mail by the Internet.

The electronic access interface 38 may have a connection (not shown in FIG. 1) to the PBX 26 and thence to a telephone company. For example, the connection may include dedicated software, SLIP/PPP lines, and/or integrated services digital network (ISDN) lines for connecting the network 30 to the PBX 26 and/or the telephone company. Accordingly, E-mail and multimedia communications, including graphics, audio, and video, may be provided to stations 32, 34.

It is understood that other sources of transactions may be included, such as wireless telephone and satellite link-ups. The sources may be connected directly to the transaction processing system 12 for processing and routing to appropriate stations 32, 34 through the network 30.

The system 10 may also include transceivers 40 for connecting the PBX 26 to remote units 42 for transmitting and receiving transactions and/or other data. Such remote units 42 may include speakers such as an intercom system for broadcasting audio messages within a facility, with such audio messages originating from the stations 32, 34 or from an automated pager system of the network 30 and transmitted through the PBX 26. Alternatively, the transceivers 40 may be sensors for operation in a locating system for locating remote units 42, such as devices, badges, and the like which transmit, for example, infrared signals. The network 30 may then process such infrared signals to determine the location of the remote units 42 in a facility, which may then be used by a supervisor at a supervisor station 32, in a manner described in greater detail in U.S. Pat. No. 5,465,286, cited above, as well as commonly assigned U.S. Pat. No. 5,291,399, issued Mar. 1, 1994; and U.S. Pat. No. 5,465,082, issued Nov. 7, 1995; each being incorporated herein by reference.

In another embodiment, the transaction processing system 12 may include an automatic source identifier 22, which may be hardware and/or software known in the art for determining a source telephone number or address implemented by automatic number identification such as CALLER ID. The automatic source identifier 22 determines a telephone number or electronic address of an incoming call or electronic signal, as described below.

The stations 32, 34 may be a terminal, a personal computer, and/or a workstation using, for example, the "INTEL" "PENTIUM" microprocessor, memory devices such as a 1 GB hard drive and 16 MB of RAM, and various input and output devices such as a telephone handset or headset, a mouse, a keyboard, and/or a display. It is understood that other microprocessors may be used, such at the PowerPC microprocessor.

The stations 32, 34 may operate custom telemarketing software operating, for example, in the UNIX operating system to perform various telemarketing and supervisory functions such as described in the commonly assigned patents and patent application, incorporated herein and cited above.

For handling various types of transactions, such as E-mail, voice mail, graphics, video calls, etc., the network 30 and the stations 32, 34 include appropriate transaction processing hardware and/or software. For example, to process video calls as well as video clips obtained over the Internet, the network 30 may include a VGA video board to generate video graphics at the stations 32, 34. Alternatively, each station 32, 34 includes an individual VGA video board to generate graphical displays such as user menus for facilitating telemarketing capabilities and call management by the agents and by the supervisor.

For facsimile transmissions, the network 30 or, alternatively, the transaction controller 18, includes appropriate facsimile protocols and scanning protocols for converting facsimiles to text and vice versa which may be received by or sent from the stations 32, 34. Alternatively, the stations 32, 34 may include the facsimile and scanning protocols and appropriate facsimile and scanning devices for processing facsimiles and scanned documents.

Figure 2:
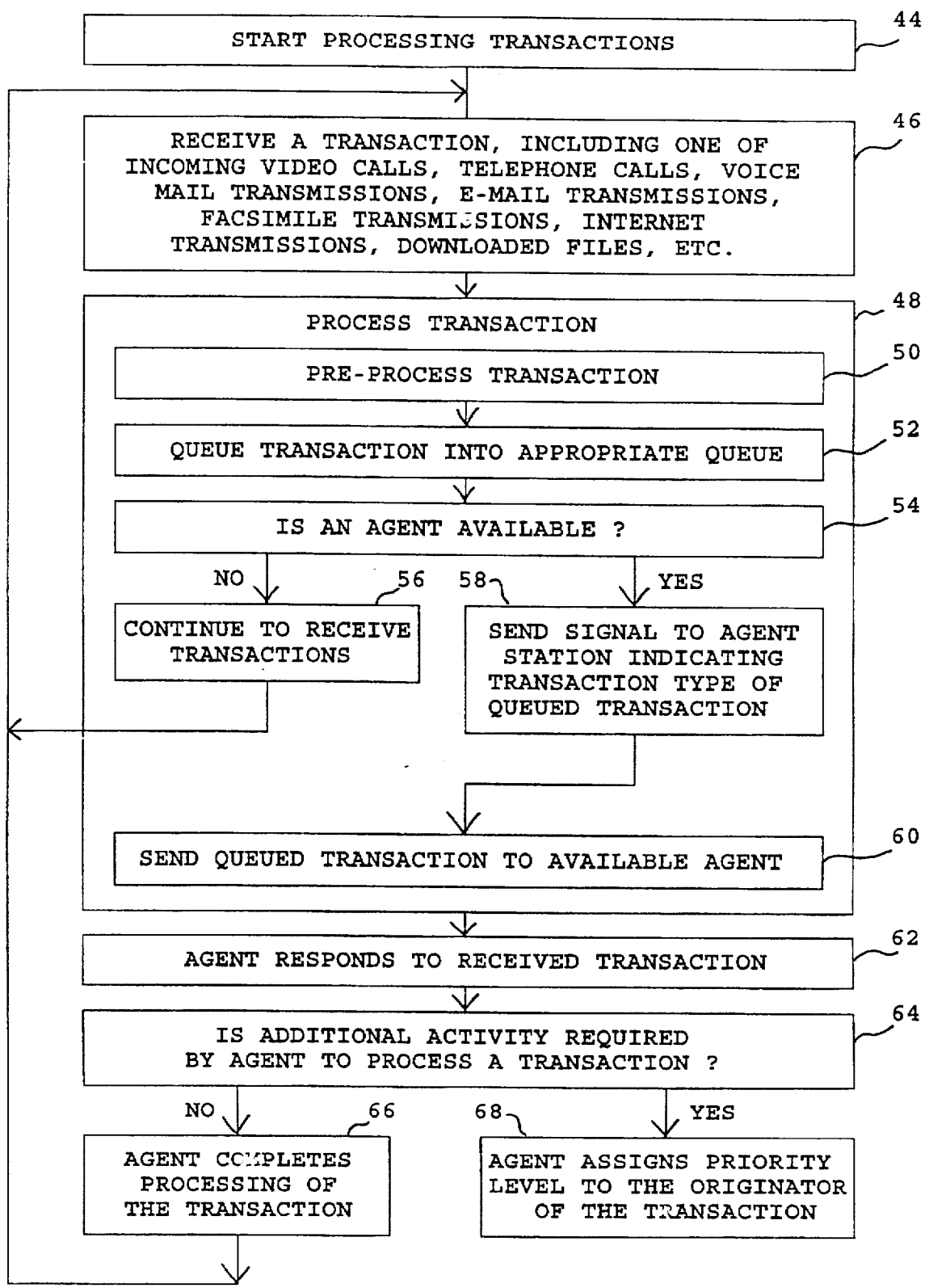
FIG. 2 is a flowchart illustrating the method of operation of the transaction processing system.

As shown in FIG. 2, the method for processing transactions includes the steps of starting the processing of transactions in step 44, such as initializing system parameters, having agents log into the transaction processing system 12, and connecting the transaction processing system 12 to on-line services and/or the Internet. The transaction processing system 12 then receives a transaction from either inside the system 10, for example, outbound calls and E-mail from agents, or outside the system 10, such as inbound calls and E-mail from customers. The transactions include one of incoming video calls, telephone calls, voice mail transmissions, E-mail transmissions, facsimile transmissions, internet transmissions, downloaded files, etc. in step 46, and processes the transaction in step 48 using the transaction controller 18.

Step 48 includes the steps of pre-processing the received transactions in step 50, which includes the step of generating an identifier using the identifier generator 20, and associating the identifier with a respective transaction. The pre-processing may also include the step of determining a transaction type of the transaction by, for example, the type of source, such as from the video system 28, the voice mail system 36, etc., or by a characteristic signal or format of the transaction. A facsimile transmission may include a characteristic polling signal, while a Internet packet may include an identifying data header.

The transaction controller 18 may use techniques known in the art to determine the type of transaction received, and may then generate a transaction type signal which is associated with the transaction and which identifies the type of transaction. In an illustrative embodiment, the transaction type signal may be a bit sequence using a predetermined classification system.

The method then queues the transactions into an appropriate queue in step 52. In an illustrative embodiment shown in FIG. 3, a facsimile transaction FT-L 70, which may be a concatenation of a facsimile bit sequence 72 received through the transaction interface 24 and the respective identifier L 74 from the identifier generator 20, is queued in a facsimile queue 76, while an inbound call IC-M having identifier M is queued in an inbound call queue 78 and an outbound call OC-N having identifier N is queued in an outbound call queue 80. The transactions in a queue of a specific type may be queued and processed in a first-in, first-out order, although other queue processing techniques may be employed. Alternatively, as shown in FIG. 4, multiple transactions of diverse types may be queued in a single queue 82, and queued transactions may be processed by transaction type order or by queued order, regardless of the transaction type. For example, although facsimile transaction FC-1 84 is the first transaction in the queue 82, an inbound agent at one of the agent stations 34 may access the first inbound call IC-1 86 in the queue 82 instead of the facsimile transaction 84. In this manner, by sharing a single queue and having selective transaction access, the memory space and queue processing capabilities required may be minimized.

Figure 3:
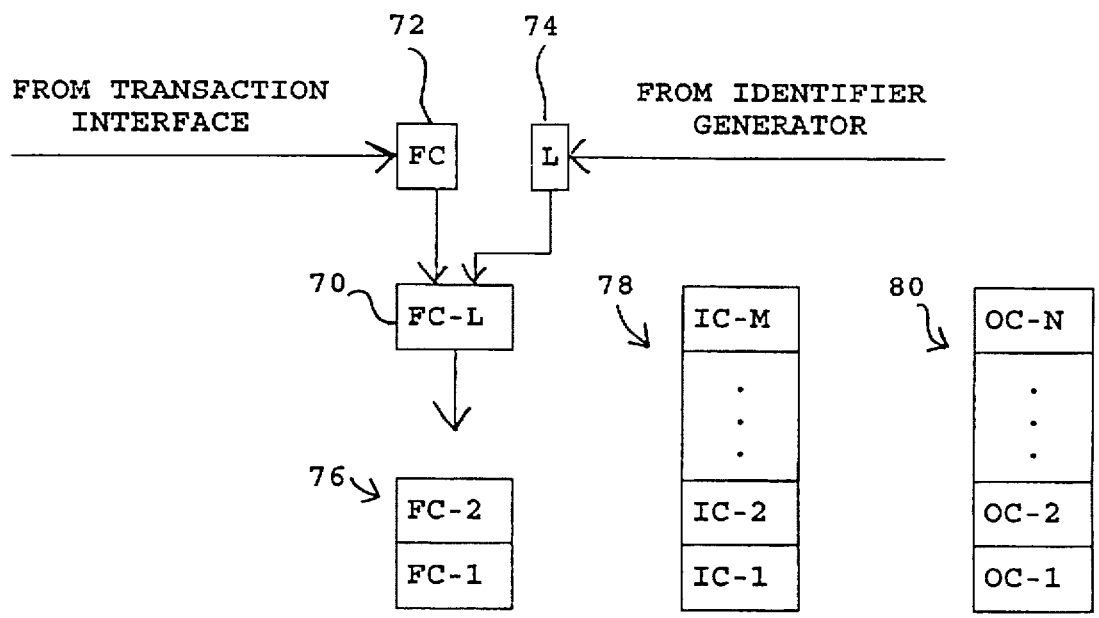
FIGS. 3–5 illustrates transaction queues.
Figures 4, 5:
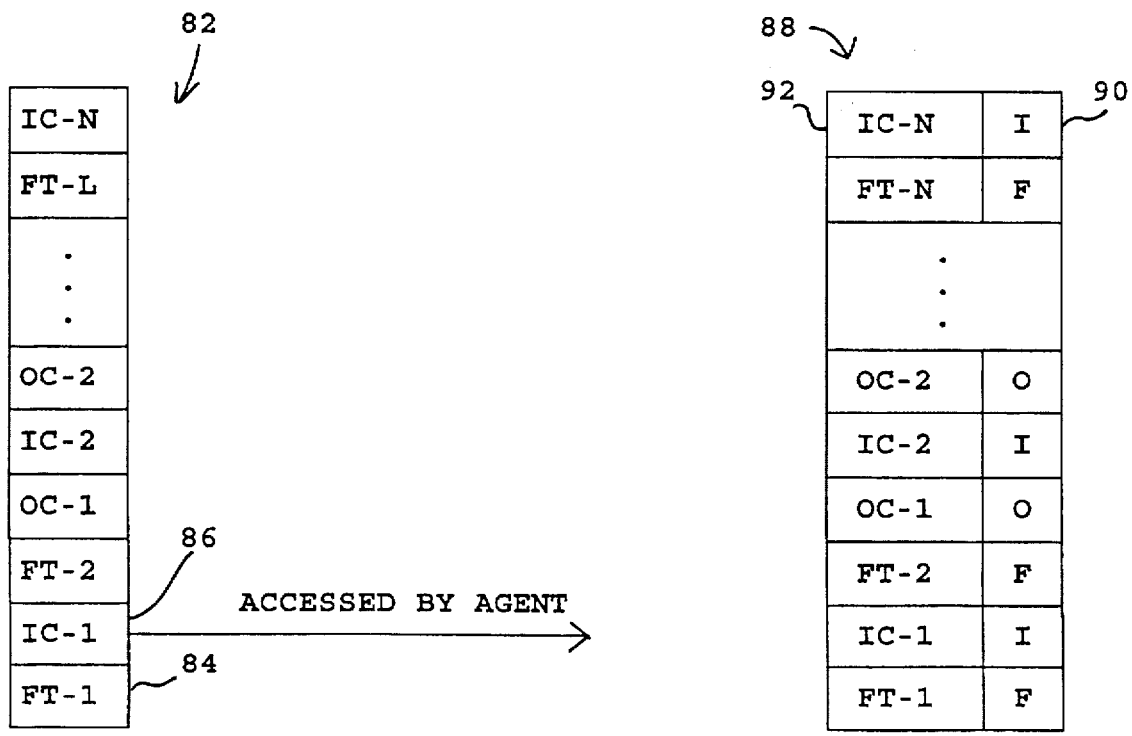

The transaction controller 18 may allow agents to manually select a queued transaction to be accessed and acted upon from the queues shown in FIGS. 3-4. Alternatively, the transaction controller 18 may automatically send the queued transactions to a next available agent. In a further embodiment, the transaction processing system 12 may store agent and supervisor data in the memory 14 which identifies each agent and supervisor as being capable of receiving specific types of transactions. For example, agents may be designated in the memory 14 as inbound agents and outbound agents which exclusively handle inbound calls and outbound calls, respectively. Alternatively, agents may be redesignated as either inbound or outbound as queue processing requires such redesignation to make more agents available to handle a specific type of transaction. The transaction controller 18 may then determine the status of the redesignated agents by automatically scanning the memory 14 for current agent status at predetermined intervals, and automatically direct specific types of transactions to them. For example, an inbound agent may receive inbound calls as transactions from the transaction controller 18, but the transaction controller 18 may detect the redesignation of the inbound agent as an outbound agent and redirect only outbound calls and transactions to redesignated outbound agent.

In addition, specific agents may be assigned to primarily process a specific transaction, such as facsimiles, voice mail, E-mail, etc., but may have a standby status for secondary types, tertiary types, or other types of transactions beyond tertiary transactions. For example, one agent may be assigned to handle facsimile transactions as they arrive, but may be reassigned to handle E-mail upon the arrival of such E-mail. In this manner, employees of a facility, such as agents and supervisors, may be promptly provided transactions as the employees become available, and employees may be assigned different tasks as needed. Alternatively, the transactions may have designations associated therewith which are set for the skills of the agent or person getting the transactions. For example, the transaction may involve a language such as Spanish, so secondary, tertiary, or beyond-tertiary processing may be performed such as directing the transaction to a Spanish-fluent agent; or alternatively using a user-controlled Spanish menu of selections or an automated Spanish translator system.

Referring to FIG. 2, the method then determines if an agent is available in step 54. If no agent is available, the transaction processing system 12 maintains the transaction in an appropriate queue as in FIGS. 3-4, and continues to receive transactions in step 56 by looping back to receive transactions in step 46. If an agent is available, then the transaction controller 18 sends a signal to agent station indicating the transaction type of the queued transaction in step 58, and sends a next queued transaction to the available agent in step 60.

The transaction type signal may be generated from a code stored in the memory 14 associated with each type of queue. For example, each of queues 76, 78 and 80 in FIG. 2 may have a corresponding bit sequence or label indicating the type of transactions queued therein. Alternatively, a single queue 88 as in FIG. 5 may include a transaction type 90 associated with each corresponding transaction 92. For example, "I" may designate inbound calls, "O" may designate outbound calls, "F" may designate facsimiles, "VM" may designate voice mail, "EM" may designate E-mail, etc. It is understood that other codes may be used, such as codes in a predetermined system such as "1" for inbound calls, "2" for outbound calls, etc. The transaction type 90 may then be parsed from the transaction 92 and sent to the agent station 34 prior to the transmission of the transaction 92.

By sending the transaction type signal to the agent station 34, the agent station 34 may prepare to receive the transaction by retrieving data from the memory 14 concerning the transaction, such as biographical data of a caller, and/or facilitating the execution of an interactive transaction processing protocol by the agent. Automated look-up and/or access to a customer host database may be performed to match the transaction to a particular customer record and to present the appropriate host screens and information to the agent. In an illustrative embodiment, the interactive transaction processing protocol may be an input screen on a display allowing an agent to input data in data fields having associated labels or questions. Alternatively, the interactive transaction processing protocol may be set of aural prompts or instructions, which may be heard only by the agent, to conduct aural or audio-visual processing of the transaction.

For example, in anticipation of receiving an outbound call, the agent station 34 may generate an outbound call pre-processing screen for inputting data as the agent transacts with the called party; for example, during a telemarketing campaign. In addition, in anticipation of receiving data from the Internet such as downloaded multimedia files, the agent station 34 may log onto the Internet and execute an Internet browser to process the downloaded multimedia files. Furthermore, in preparation to receive E-mail, the agent station 34 may automatically generate an E-mail screen.

After the transactions are processed in step 48 and sent to agent stations, the agent responds to the received transaction in step 62; for example, by modifying data stored in the memory 14 to schedule appointments with parties over a telephone connection, an Internet or E-mail link, etc. If no additional activity is determined in step 64 to be required, the agent completes processing the transaction in step 66 by, for example, closing opened files, storing appointment data, etc., and the transaction processing system 12 continues to process transactions. However, if additional activity is required, the agent assigns a priority level in step 68 to the originator of the transaction for further actions to be performed. For example, a follow-up call to a telemarketing transaction may be scheduled for calling a customer at a later date, or an appointment may be scheduled with a customer, such as a blood donor for giving blood.

An identifier to a transaction record may be placed such that, in the event that the transaction originator needs to call back or otherwise contact a customer at a later date with respect to the original transaction, the identifier may be used to process the transaction, for example, by sending the transaction to the original agent who made contact with the customer and/or by automatically presenting the agent with specific screens or information. The identifier may also be used to accelerate the priority of the transaction within a given queue.

In an alternative embodiment, the transaction controller 18 may include an automatic source identifier 22 using hardware and/or software known in the art, such as CALLER ID, for automatically identifying the telephone number of an inbound call, facsimile, voice mail, E-mail, etc. In addition, the transaction controller 18 may include hardware and/or software for storing electronic transmission addresses, such as E-mail addresses of received E-mail as well as Internet addresses such as hypertext transfer protocol (HTTP) and internet protocol (IP) addresses from data transmissions received via the Internet and the World Wide Web.

The automatic source identifier 22 may be used in conjunction with an outbound call and message telemarketing campaign, in which outbound telephone calls, voice mail, E-mail, facsimiles, etc., are sent to called or contacted parties, for example, using an automatic dialer, of which the telemarketing campaign has information. For example, the telemarketing campaign may have addresses and/or personal data on individuals, companies, or other entities such as charitable donation history, consumer history, political contributions, etc. for contacting potential customers such as blood donors or purchasers of goods.

Figure 6:
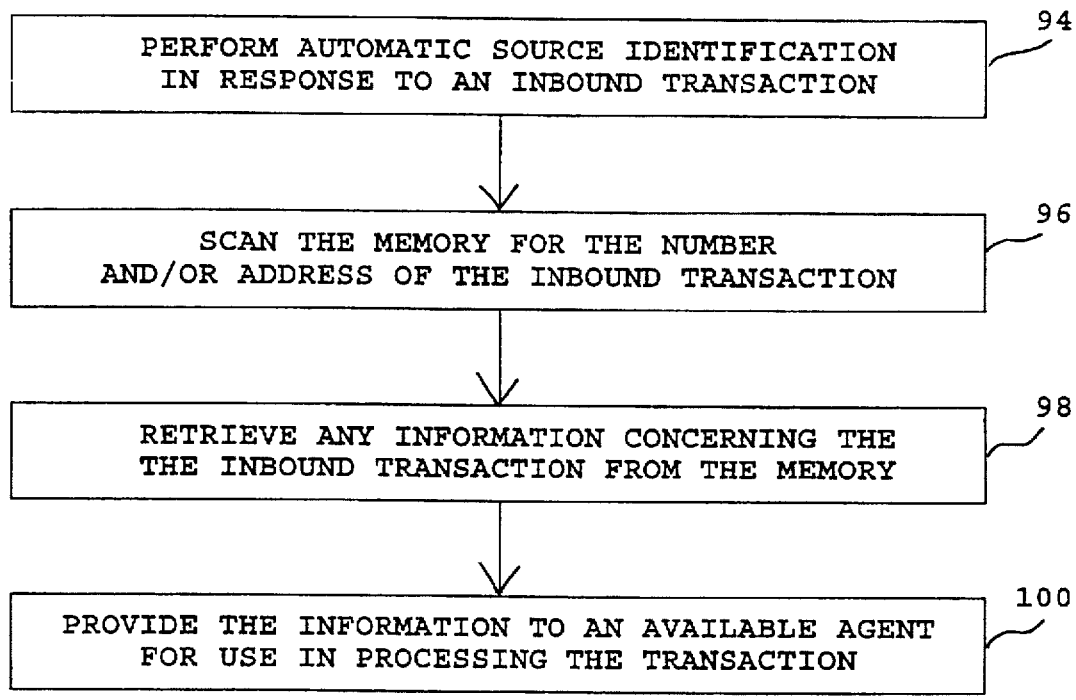
FIG. 6 is a flowchart illustrating automatic number identification and processing.

Such contacted customers may respond to such outbound transactions by calling or electronically contacting the telemarketing campaign through the transaction processing system 12. As shown in FIG. 6, the transaction processing system 12 then pre-processes a transaction in response to an entity; i.e. a person, institution, or computer system, that initiates an inbound transaction by activating the automatic source identifier 22 in step 94 to determine the entity's source telephone number or electronic address. Such pre-processing may be performed as step 50 of FIG. 2 is performed.

The transaction processing system 12 then scans the memory 14 for any information concerning the entity based on the telephone number or electronic address in step 96, retrieves such information in step 98, and provides the information to an available agent in step 100 to process the transaction. The providing of such information to an available agent may be performed as step 60 of FIG. 2 is performed. The information may be sent concurrently or prior to the arrival of the transaction at the agent station 32, allowing the agent to review the information during the transaction. In this manner, agents may be prepared to more efficiently process a transaction for improved telemarketing results.

Using the transaction processing system 12, telemarketing and other transaction-driven activities such as charitable and information-intensive organizations in companies may be effectively managed. In an illustrative embodiment, the transaction processing system 12 may include ACD features for ACD management and supervising, such as those features described in greater detail in commonly assigned U.S. Pat. No. 5,341,412, issued Aug. 23, 1994. For example, as shown in FIG. 7 in conjunction with FIG. 1, an ACD system 102 may include a plurality of agent desktops 104, each including a workstation 106, an input device 108, and a telephone 110 including a telephone base 112 and a telephone headset 114, with such components being incorporated in the agent station corresponding to the agent station 34 in FIG. 1.

Figure 7:
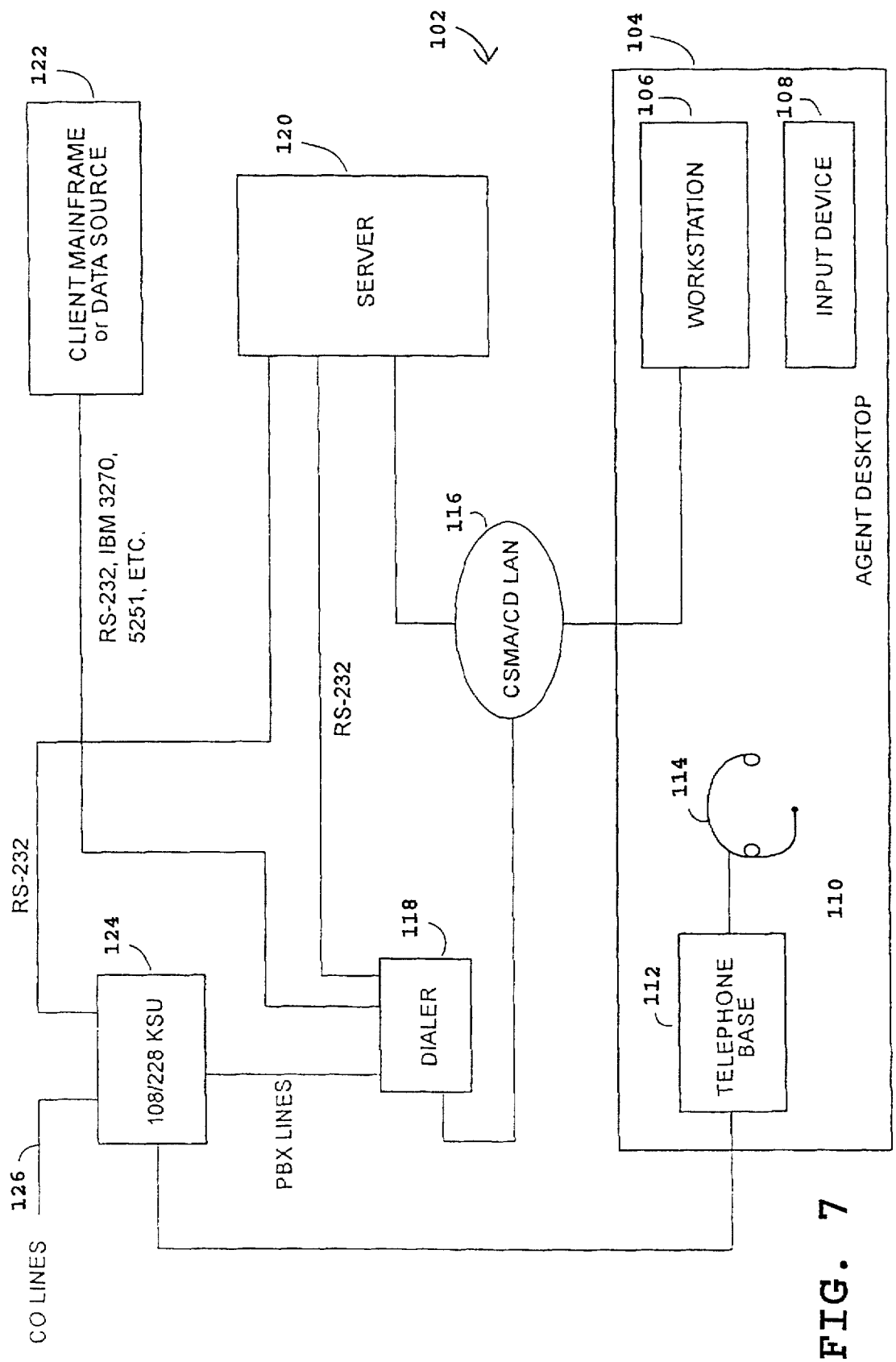
FIG. 7 is a block diagram of an ACD system.

Referring to FIG. 7, the workstation 106 is connected to a CSMA/CD LAN 116, corresponding to network 30, for processing inputs from and outputs to the workstation 106. The ACD system 102 includes an automatic dialer 118 which may be an "INFOSTAR" dialer, available from "EXECUTONE INFORMATION SYSTEMS, INC.", and which is connected to the CSMA/CD LAN 116, to a server 120, to a client mainframe or data source 122, and to a PBX 124 which may be a Key Set Unit (KSU) such as the IDS communications processor in 108/228/432/648 port configurations, available from "EXECUTONE INFORMATION SYSTEMS, INC."

The PBX 124 of FIG. 7 corresponds to the PBX 26 in FIG. 1, and is connected to a telephone company through central office (CO) lines 126, as well as to the telephone bases 112 of the agent telephones 110. Alternatively, agent telephone sets may be connected directly to a server instead of to or through the PBX 124.

In the illustrative embodiment, the server 120 receives a daily download of telephone numbers and/or appointment data at the beginning of each day from the data source 122, and the automatic dialer 118 automatically dials the telephone numbers through the PBX 124 to connect agent telephones 110 to customers. Using the workstation 106 and input device 108, the agent may then establish appointments for customers, for example, blood donors, with the appointment data stored in memory of the server 120.

At the end of the day, the server 120 then uploads a record of the day's activities and appointment data back to the data source 122. The automatic dialer 118 may include the hardware, firmware, and/or software required to perform protocol conversion between the data and communication protocols of the server 120 and the data source 122.

Figure 8:
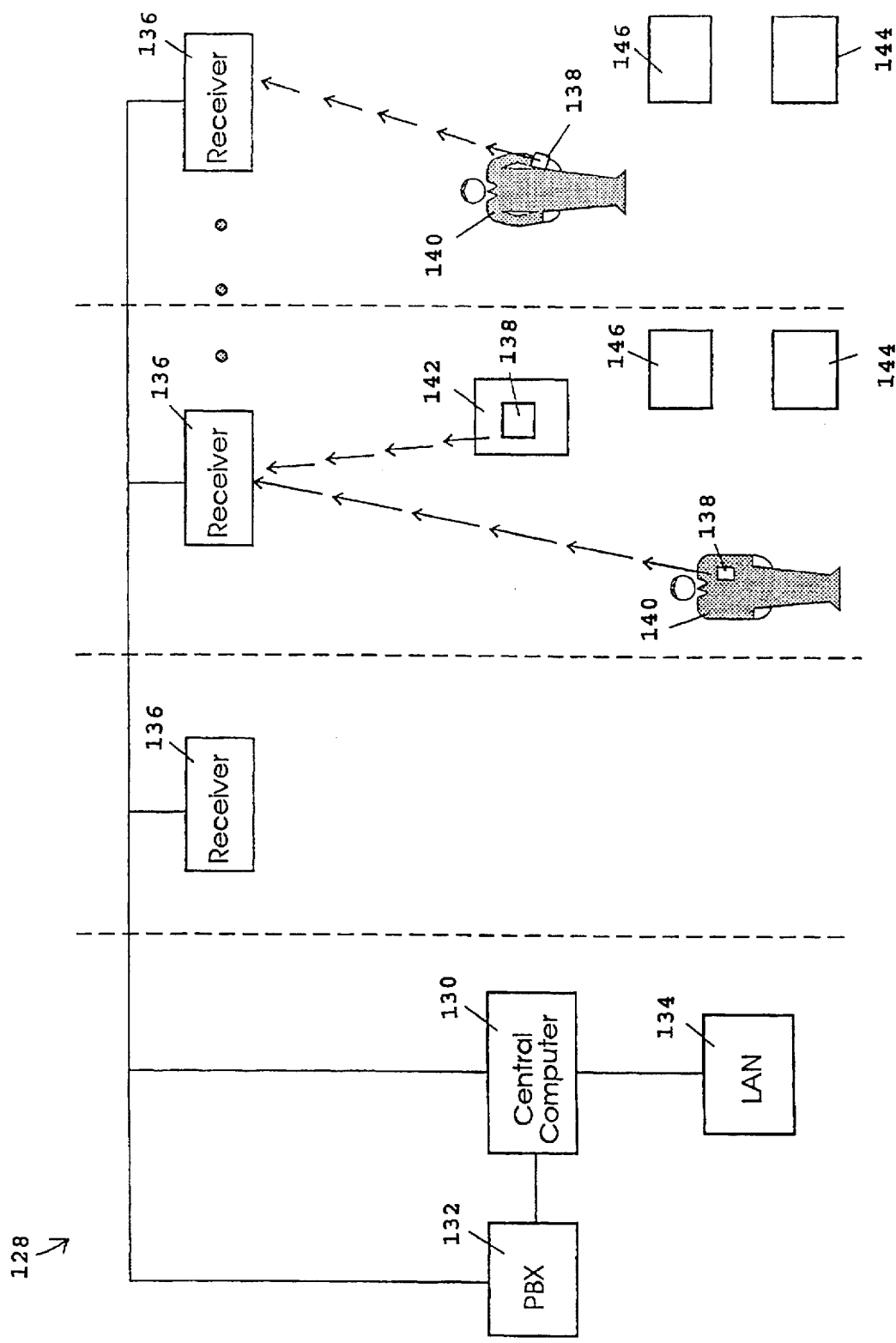
FIG. 8 is a block diagram of a locator system.

In an alternative embodiment shown in FIG. 8, the transaction processing system 12 includes a locator system 128 for improving employee and information management in companies. In an illustrative embodiment, the transaction processing system 12 may include locator features for location determination and tracking, such as those features described in greater detail in commonly assigned U.S. Pat. No. 5,465,286, issued Nov. 7, 1995. For example, as shown in FIG. 8 in conjunction with FIG. 1, a locator system 128 may include a central computer 130 connected to a PBX 132 and a LAN 134, which correspond to the PBX 26 and network 30 of FIG. 1.

The locating system 128 includes a plurality of receivers 136 connected to the central computer 130 and PBX 30 and operatively connected by wireless communications to a plurality of remote transmitting units 138 such as transmitting badges which are attachable to personnel 140 or objects 142. Each remote transmitting unit 138 is assigned to each agent and is therefore associated with a corresponding telephone station 144 having an associated telephone 146. The badges transit information including badge identification through a communications channel to a central receiver of the locator system, which may be included in the central computer 130 or the PBX 132. The receivers 136 and remote transmitting units 138 may communicate using infrared (IR) signals. The receivers 136 may further communicate with the central receiver via dedicated wires or cables. Alternatively, the individual telephone stations may include a sensor for receiving the badge transmissions and circuitry for relaying the badge information to the PBX 132.

Using the embodiments shown in FIGS. 7–8 as well as the principles described above for processing diverse transactions such as E-mail, voice mail, video calls, facsimiles, etc., existing systems for telemarketing, political campaigns, blood drives, etc. may be integrated for more efficient information management and processing.

While the disclosed transaction processing system and method have been particularly shown and described with reference to the preferred embodiments, it is understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. A transaction processing system comprising:
   a transaction interface for receiving transactions of a plurality of types from their respective sources, and conveying the received transactions;
   a memory for storing the transactions in at least one queue; and
   a processor including:
      an identifier generator for generating an identifier for each transaction in the queue; and
      a transaction controller for using the identifier to provide access by an agent to the transaction corresponding to the identifier, said transaction controller queuing each transaction with an associated transaction type signal concatenated with the transaction.

2. The transaction processing system of claim 1 wherein the memory stores the transactions in a plurality of queues; and
   the transaction controller queues a respective transaction associated with a respective transaction type into a queue having the corresponding transaction type.

3. The transaction processing system of claim 1 wherein the memory stores transactions including one of an inbound call, an outbound call, a facsimile signal, an E-mail signal, a voice mail signal, a video signal, a multimedia signal, and a data file.

4. The transaction processing system of claim 1 further comprising:
   a plurality of agent stations associated with a respective agent for processing transactions.

5. The transaction processing system of claim 4 wherein the transaction controller conveys transactions of a predetermined type to an agent station of an agent associated with a predetermined transaction type.

6. The transaction processing system of claim 5 wherein the transaction controller responds to a selection signal from an agent station to convey queued transactions selected by an agent from the queue to the agent station of the agent.

7. The transaction processing system of claim 5 wherein the memory stores a designation of each respective agent to receive at least one type of transaction; and
   the transaction controller responds to a corresponding designation of an agent to convey a transaction of the agent, with the transaction having a transaction type associated with the designation of the agent.

8. The transaction processing system of claim 7 further including:
   designation means for redesignating the designation of an agent to receive specific transaction types.

9. The transaction processing system of claim 5 wherein the transaction controller responds to the identifier associated with each transaction for conveying the associated transaction to the corresponding agent station of an available agent.

10. The transaction processing system of claim 9 wherein the identifier generator generates the identifiers for transactions to determine a first-in, first-out (FIFO) order in the queue; and
    the transaction controller responds to the identifiers to provide a first-out transaction to an available agent.

11. A transaction processing system comprising:
    at least one agent station having an agent interface;
    a memory for storing transactions of at least one transaction type in at least one queue; and
    a processor including:
       a transaction controller for conveying a queued transaction having a predetermined transaction type to the at least one agent station, said transaction controller queuing each transaction with an associated transaction type signal concatenated with the transaction; and
       a signal generator for generating a transaction type signal corresponding to the transaction type of the queued transaction being conveyed, wherein the transaction type signal is transmitted to the agent station prior to the conveying of the queued transaction;

wherein the agent station, responsive to the transaction type signal, generates a transaction processing protocol to interactively allow the agent to process the transaction upon arrival at the agent station.

12. The transaction processing system of claim 11 wherein the agent interface of at least one agent station includes a display; and the agent station, responsive to the transaction type signal, generates a screen on the display associated with the transaction type of the transaction being conveyed for facilitating processing of the transaction by an agent.

13. A transaction processing system comprising:

at least one agent station having an agent interface;

a memory for storing transactions of at least one type in at least one queue, and for storing caller data; and a processor including:

a transaction controller for conveying a queued transaction to the at least one agent station, said transaction controller queuing each transaction with an associated transaction type signal concatenated with the transaction;

a source identifier, responsive to a received transaction, for identifying the source of the received transaction; and means, responsive to the identified source, for searching the stored caller data and, responsive to a match of the stored caller data with the source, for providing the stored caller data to an agent station for processing the received transaction.

14. The transaction processing system of claim 13 wherein the source identifier is an automatic number identification device for determining a telephone number of a received telephone call as the received transaction; and the searching means searches the stored caller data to determine a match of the telephone number with the caller data.

15. A transaction processing system comprising:

a transaction interface for conveying transactions of a plurality of types;

a memory for storing transactions of at least one type in at least one queue; and a processor including:

an identifier generator for generating an identifier for each transaction in the at least one queue;

means for determining the availability of an agent for handling further processing of the identified transaction; and a transaction controller for using the identifier to provide access by an agent to the transaction corresponding to the generated identifier, said transaction controller queuing each transaction with an associated transaction type signal concatenated with the transaction.

16. The transaction processing system according to claim 15, further comprising a plurality of agent stations associated with a respective agent for processing transactions.

17. The transaction processing system according to claim 16, wherein said transaction controller conveys transactions of a predetermined type to an agent station of an agent associated with the predetermined transaction type.

18. An automatic call distribution (ACD) system capable of handling a plurality of transactions in addition to telecommunication transactions comprising:

a plurality of agent stations;

a memory for storing transactions of at least one type in at least one queue; and a processor including:

means for determining the availability of an agent at one of said plurality of agent stations;

a transaction controller for conveying a queued transaction having a predetermined transaction type to one of said plurality of agent stations, said transaction controller queuing each transaction with an associated transaction type signal concatenated with the transaction; and a signal generator for generating a transaction type signal corresponding to the transaction type of the queued transaction being conveyed, said transaction type signal being transmitted to the respective agent station prior to conveying the queued transaction.

19. The automatic call distribution system according to claim 18, further comprising an agent interface having a display within each of said plurality of agent stations, said agent station generating a display associated with the transaction type being conveyed in response to the transaction type signal for facilitating processing of the transaction by an agent.

20. The automatic call distribution system according to claim 18, wherein the plurality of transactions include at least one of an inbound call, an outbound call, a facsimile signal, an E-mail signal, a voice mail signal, a video signal, a multimedia signal, and a data file.

* * * * *